Jan. 30, 1951 L. ESPENSCHIED 2,539,535
SOURCE OF ELECTRICAL ENERGY
Filed March 16, 1946 2 Sheets-Sheet 2

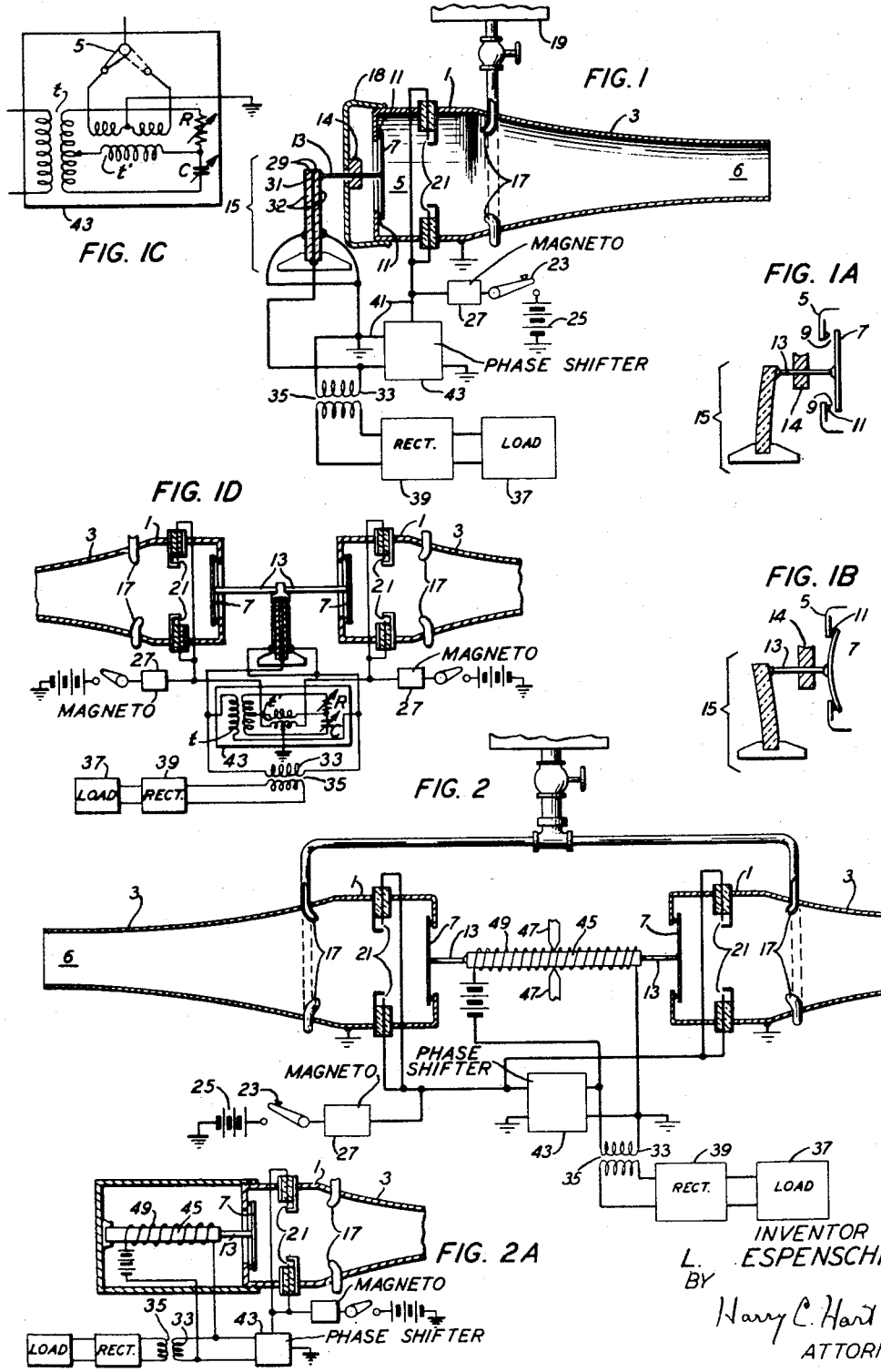

INVENTOR
L. ESPENSCHIED
BY
Harry C. Hart
ATTORNEY

Patented Jan. 30, 1951

2,539,535

UNITED STATES PATENT OFFICE 2,539,535

SOURCE OF ELECTRICAL ENERGY

Lloyd Espenschied, Kew Gardens, N. Y., assignor to Bell Telephone Laboratories, Incorporated, New York, N. Y., a corporation of New York Application March 16, 1946, Serial No. 654,976

8 Claims. (Cl. 290—1)

This invention relates to prime sources of energy and more particularly to systems for producing electrical energy in which a vibratory electric generator such as a piezoelectric element or a magnetostrictive element is excited by mechanical vibrations of an internal combustion device. The disclosure and claims herein are close to those in an application of Warren P. Mason, Serial No. 655,001, now Patent No. 2,522,389, issued September 12, 1950, filed on the same day and which is entitled to the generic claims.

An object of the invention is to produce electrical energy by causing successive explosions of a combustible vapor or powdered fuel to induce vibrations in the vibratory electrical generator.

Another object of the invention is to convert the energy of burning fuel into electrical energy with relatively little displacement of mechanical masses and without the use of rotating parts or mechanical elements of considerable mass.

Still another object of the invention is to utilize the energy of a high frequency series of explosions to excite a piezoelectric element.

In accordance with the invention in one of its simpler forms an explosion chamber, open at one end and closed at the other only by a vibration diaphragm coupled to a vibratory electrical generator, is so designed as to sustain in a gaseous atmosphere within the chamber compresisonal vibrations of a predetermined natural high frequency. Gaseous or other very finely divided fuel introduced into the chamber at a point near the diaphragm is ignited in a series of high frequency explosions which set the diaphragm into vibration thus exciting the coupled vibratory electric generator to produce an electromotive force of corresponding high frequency. By suitably correlating the natural resonance frequencies in the vibratory electric generator, the diaphragm and the explosion chamber, electromotive forces of relatively high intensity may be built up and utilized either to supply high frequency energy directly to a load or rectified to produce unidirectional current.

In the drawings:

Fig. 1 shows a schematic diagram of the electric circuit and a sectional diagram of the apparatus of a vibratory system for converting explosion energy into electrical energy;

Figs. 1A and 1B are diagrammatic representations of a portion of Fig. 1 under different conditions of operation and Fig. 1C illustrates in detail the phase shifter element shown diagrammatically in Fig. 1; Fig. 1D illustrates a modification of the system of Fig. 1 to include two explosion chambers;

Fig. 2 shows a modification of the system of Fig. 1 in which a pair of explosion chambers are coupled to a single magnetostrictive generator Fig. 2A illustrating a further modification embodying a single explosion chamber;

Figure 3:
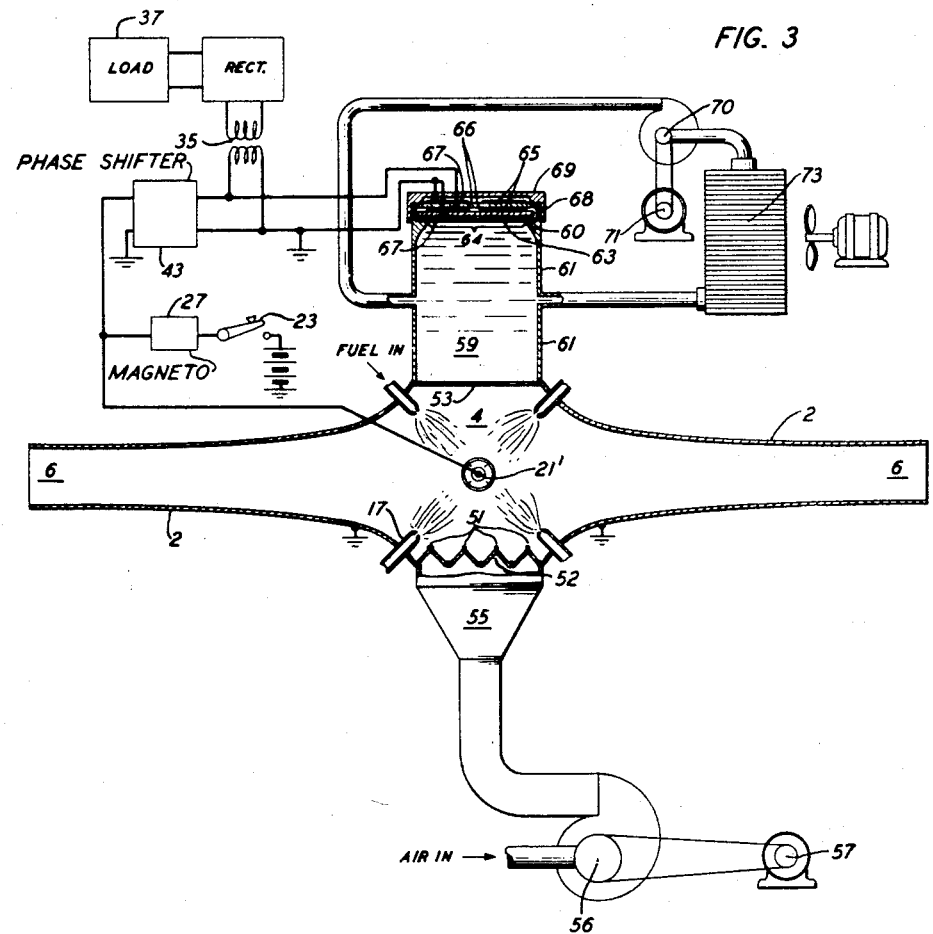
Fig. 3 shows another modification of the system of Fig. 1 in which a plurality of explosion chambers are employed and which differs, further, from Fig. 1 in the arrangement of valves and the manner of coupling between the explosion chambers and the vibratory elements.

Referring now to the drawings, the apparatus of Fig. 1 includes an explosion chamber 1 coupled to a resonant tube 3. The two together constitute a resonator designed so that the column of gas enclosed may have a predetermined natural frequency for compressional waves. The chamber 1 is substantially closed at one end 5 by a metallic diaphragm 7 mounted in any suitable manner to permit movement of the diaphragm inwardly, thus exposing an annular opening 9, shown in Fig. 1A, whereby the explosion chamber communicates with the external atmosphere, and outwardly to a point where its travel is limited by bearing against flanges 11 of the explosion chamber, thus closing the opening 9 and sealing the explosion chamber tightly. In its maximum outward excursion, shown in Fig. 1B, the diaphragm 7 may come into snug, sealing contact with the flanges 11 at the end of the chamber so as to support the pressures generated by the explosions. and may be flexed somewhat in addition.

To insure proper seating of the diaphragm 7 against the flanges 11, the diaphragm 7 may be guided in its axial movement, and lateral movement prevented, in any desired manner. For example it may be fixed or coupled to a spindle or link 13, which slides in a hole drilled through a member 14 which may be supported as by brackets 18 from the wall of the head end of the resonator 1. This link may also serve to communicate movements of the diaphragm 7 to a vibratory electric generator 15.

In its inward excursion the diaphragm may separate from the flanges 11 sufficiently to permit an in-rush of air into the chamber to scavenge the combustion products of the previous explosion and supply oxygen to support the ensuing one. Projecting into the chamber 1 are fuel jets 17 through which is introduced the atomized fuel oil or other combustible gaseous fuel or powdered solid fuel, as, for example, finely comminuted carbon dust. The fuel jets 17 are supplied from a fuel tank 19. Associated with the fuel jets is a suitable electric ignition system having one or more spark gaps 21 and so designed with respect to the position of the spark gaps and the timing of the spark as to initiate ignition of the mixture of air and fuel at a moment when the diaphragm 7 is about to reach its outward excursion so as best to communicate the sudden high pressure, which arises when the explosion takes place, to the vibratory electric generator 15. The firing of the explosive mixture at the proper instant is secured by means of the phase shifter 43. The operation is as follows: each explosion in chamber 5 deflects the piezoelectric crystal and generates one cycle of the output electric current of, say, 1,000 cycles per second. The output voltage is tapped off through the phase shifter 43 to actuate the spark plugs 21. The phase shifter corresponds to the spark timing mechanism of an ordinary combustion engine and may be of any of a variety of types. The type indicated in Fig. 1 is entirely electrical, i. e., it is not geared mechanically to the motion of the engine. It accomplishes the timing adjustment by shifting electrically the phase of the wave impressed upon it from the crystal generator. Such phase-shifting circuits are well known in the art, as described, for example, in the books: "Phenomena in High-Frequency Systems," by August Hund, published 1936, chapter IV, Phase Changers, pages 143 to 149, and "Time Bases" by O. S. Puckle, published 1943, pages 190–191.

A suitable phase-shifting circuit is illustrated in Fig. 1C. The alternating current output of the piezoelectric crystal is fed to a transformer $t$, the secondary winding of which is center tapped. Across the secondary terminals there is connected a combination of resistance R and condenser C in series. Their junction point is connected back to the secondary winding mid-point through the primary of a transformer $t'$. The secondary of the latter transformer applies the phase-controlled voltage wave to the spark plugs. The values of R and C are adjustable. If R is made zero then the phase shift is zero; if R and C are made equal in impedance, the phase shift is 90°; if R is made infinite the phase shift is 180°, etc. for intermediate values. Phase values in the opposite sense, meaning up to 360°, are obtained by reversing the secondary of transformer $t'$ by operating switch S. In practice these values R and C are adjusted empirically until the phase shift is such as to give optimum timing for the firing, and the circuit values are then fixed. This condition of high pressure due to each explosion travels as a wave down the resonator tube 3 to its open end 6 and is there reflected, a low pressure wave returning up the tube from its open end 6 to the closed end 5 and diaphragm 7. The resulting reduction of pressure inside the diaphragm permits the atmospheric pressure outside to force the diaphragm inward, thus admitting more air to support another explosion. This rarefied condition is then reflected at the diaphragm, travels down the tube to the open end 6, is there reflected, and returns again up the tube to the explosion chambers as a high pressure wave, thus forcing the diaphragm outward and closing the annular opening 11. It is at this instant that the ensuing explosion should be caused to take place, the diaphragm 7 just closing and therefore in the most favorable position to receive, support and utilize the full force of the ensuing explosion. Each compression forces the diaphragm outward and each rarefaction draws it inward. These movements are communicated by the coupling link 13 to the vibratory electric generator 15 which is thus caused to execute mechanical vibrations at the explosion frequency. Thus the diaphragm 7 serves both as a valve and as a piston. The operation may be started in any desired manner, for example, by closing a starting switch 23 which applies a voltage, as from a battery 25 to a mechanism 27, which may be a magneto or the like. The latter in turn delivers a high sparking voltage to the gaps 17.

Successive explosions take place in a rapid sequence which is determined principally by the natural acoustic period of the resonator 1. Thus there are set up within the resonator standing waves of the air or gas column, characterized by a rapidly alternating sequence of compressions and rarefactions at the diaphragm 7. From the standing wave standpoint, the resonator behaves as a tube or pipe having one end open and the other substantially closed, so that its length is approximately one-quarter, three-quarters, five-quarters, etc. of the wavelength of the air or gas column vibration which it can support. As in the case of certain musical instruments such as the clarinet of which the same is true, the "closed" end is tightly closed during one part of the operation cycle but has in it an opening which is small as compared with the diameter of the chamber during the remaining portion of the operation cycle. This cyclic recurrence of the small opening, while insufficient to damp out air column vibrations, causes the numerical relation between the gas vibration wavelength and the length of the resonator to depart from the exact one given above. A further departure results from the enlargement of the diameter of the head end 5 of the resonator, i. e., the explosion chamber proper, as compared with the diameter of the tail portion or tube 3 of the resonator. As a result the numerical relation given above may be satisfied only very approximately. Nevertheless it is a convenient one to bear in mind for illustration and analysis because of the fact that, whatsoever the linear dimensions of the apparatus, a node or region of high pressure exists in the neighborhood of the diaphragm 7.

The system may be designed to have an extremely short period, for example of the order of 5,000 cycles per second or even higher, or it may have much lower frequencies extending down to say, a few hundred cycles per second. As is well known, the linear dimensions of vibratory or resonant apparatus decrease as the frequencies to which they are attuned are increased so that it is generally advantageous to keep the frequency as high as may conveniently be done for the reason that the vibratory electrical generator may be of smaller dimensions if it is to operate at high frequencies. For example, with a frequency of 5,000 cycles per second, the wavelength in free space is about 2.6 inches. In the hot gases involved, it may be as much as four inches. A combustion cylinder which is one-quarter wavelength long would then be only 1 inch in length. However, if desired, the resonator may be made an odd multiple of a quarter wavelength, for example three-quarters of a wavelength or about 3 inches in length for the same frequency; i. e., it may be operated at its third harmonic frequency. By the same token, a resonator 1 inch in length, operated at its third harmonic frequency, will vibrate at 15,000 cycles per second. These figures are illustrative of the small dimensions and high frequencies involved and show that a very small device indeed may deliver substantial amounts of high frequency electrical energy. Moreover, the electrical energy produced by the vibratory electrical generator, if of high frequency, may be relatively free from low frequency variations and may, accordingly, be more satisfactory from the standpoint of direct application to a load, or from the standpoint of simplification of a rectifier-filter combination if unidirectional current is to be used. No attempt has been made in the drawing to give exact design dimensions but the apparatus as shown is of approximately full size for operation at a fundamental frequency of the order of 1,000 cycles per second.

The vibratory electric generator 15 which is driven, by way of the link 13, by movements of the piston diaphragm 7 may be of any desired type, but for convenience, compactness, and suitability for high frequency operation, a piezoelectric element is preferred. For response to movements in flexure, the composite, so called "bimorph" arrangement may be employed, comprising two plates 29, 29, of piezoelectric material with a film or plate electrode 31 between them and electrodes 32, 32 on the outer faces. The inner electrode 31 serves as one output terminal of the device and the outer electrodes 32 are connected together and serve as the other. The construction and operation of such composite devices are well known, being described, for example, in United States Reissue Patent 20,213, December 22, 1936, to C. B. Sawyer. The piezoelectric materials themselves may be of any suitable type, for example Rochelle salt, ammonium dihydrogen phosphate (ADP) or quartz.

The electrodes 31, 32 may be connected to the primary winding 33 of a transformer 35. To the output terminals of the transformer a load 37 may be directly connected but, as illustrated in Fig. 1, a full wave rectifier 39 may be interposed. One terminal of the primary winding 33 of the transformer is connected to ground. From the other terminal of the primary winding 33 an insulated ignition conductor 41 leads by way of an adjustable phase-controlling device 43 to the spark gaps 21 of the ignition apparatus.

The return connection from the spark gaps to ground may be by way of the tube 1.

Fig. 2 discloses a system which is modified as compared with the system in Fig. 1 in two respects. First, the vibratory electric generator comprises a magnetostrictive bar 45 supported at the nodal point by a clamp 47. Second, two explosion chambers 1, 1 are employed instead of one as in Fig. 1, one explosion chamber being coupled to each end of the magnetostrictive bar 45. A single explosion chamber, as illustrated in Fig. 2A, would suffice to carry out the invention but the use of two, coupled to opposite ends of the bar 45 and vibrating in time phase coincidence, may improve the effectiveness. Similarly, a second explosion chamber might be coupled to piezoelectric element 15 of Fig. 1, being placed, for example, on the side opposite to the side on which the explosion chamber shown is placed, as illustrated in Fig. 1D. In such case the two explosion chambers should be arranged to vibrate in antiphase.

Association with the bar 45 is a winding 49 in which, as will be readily understood, an electromotive force may be induced by magnetostrictive action. The diaphragms 7, 7 are mechanically coupled to the bar 45 as by links 13, 13 to set it in vibration at the common predetermined vibration frequency of the diaphragms 7, 7 the resonators 1, 1 and the bar 45. In other respects the system may be identical with that of Fig. 1 and its operation will accordingly be readily understood.

Fig. 3 shows still another modification of the invention in which two resonating chambers 2, 2, are coupled to a single explosion chamber 4 and in which the piston function and the valve function, both of which were performed by the piston diaphragms 7 of Figs. 1 and 2, are separated. Thus the valving action is provided by an array of light, reed-like shutters 51 while the piston function is performed by a single diaphragm 53 located opposite to the shutters at the far side of the explosion chamber 4. These reed-like shutters may be of light spring steel or the like, mounted in an array on a framework or grille 52 at the opening of the intake manifold 55 into the explosion chamber 4. They may be mounted sloping to the right and to the left (in the figure) in alternation, so that free ends of adjacent reeds lie snugly against each other. They may be fixedly mounted under light inwardly directed tension, or they may be rotatably mounted, in which case a subsidiary spring may be provided to hold each reed or group of reeds in light contact with one of its neighbors. Such reed shutter valves are described and shown in "The Engineer" for October 6, 1944, at page 260. The reed-like shutter elements 51 are arranged to close when the pressure inside of the explosion chamber 4 exceeds the pressure in the intake manifold 55 and to open when the pressure inside the explosion chamber 4 is reduced below that in the intake manifold 55. Such a valve system is capable of being adjusted to open and close in succession at still higher frequencies than is possible with the piston diaphragms 7 of the other figures.

Under some conditions it may be desirable to supply air to support combustion at a pressure somewhat higher than atmospheric. To this end, a pump 56 driven by a motor 57 supplying air under pressure to an intake manifold 55 is provided. It will be understood that this feature is not essential to the invention.

When the system of Fig. 3 is in operation, high and low pressures are successively delivered at diaphragm 53 which bounds one side of the combustion chamber 4 and thence, by piston action of the diaphragm 53 to a liquid column 59 contained in a chamber 61 which reaches from the diaphragm 53 to another diaphragm 63 bearing against one face of a vibratory electric generator, for example, a composite piezoelectric element arranged to respond to two-dimensional flexural distortions. It may be a "bimorph" 64 comprising two plates 65, 65, of piezoelectric material such as Rochelle salt, ammonium dihydrogen phosphate, (ADP) or quartz, provided with internal electrodes 66 and external electrodes 67, opposite external electrodes being connected together. This arrangement, like other equally suitable arrangements, are described and shown in United States Patent 2,105,010 to C. P. Sawyer. The piezoelectric element assembly may be clamped between a shoulder 60 of the chamber 61 and an aligned shoulder 68 of a clamping ring 69. A modified bimorph arrangement which may be used if desired is described in I. R. E. Proc., vol. 21, p. 1399 (October 1933).

Alternatively, long, pencil-like crystal elements, arranged to respond to longitudinal vibrations, could be employed, their moving end cemented to and moved by a plate coupled to the liquid column 59 and their other ends fixed to a massive backing block.

The second diaphragm 63 serves to protect the piezoelectric element 65 from injurious effects of the liquid column, and may be a sheet of plastic material. The liquid column 59 is preferably approximately rectangular in cross-section and one-quarter wavelength long at the explosion frequency. Because the piezoelectric element is stiffer and more rigid than the gaseous mixture within the explosion chamber 4, the liquid particle movement at the crystal end of the liquid column 59 will be less, and therefore the dynamic pressures greater, than they are at the explosion chamber end of this column. This liquid column thus constitutes an acoustic transformer for matching the impedance of the explosion chamber 4 which is low, to that of the crystals 65 which is high. As before, the natural frequencies of the explosion chamber-resonators and of the crystals are preferably the same. This result may be obtained by adjustment of the dimensions of these elements as will be understood by those skilled in the art.

In Fig. 3 the combustion chamber is of cubical proportions comprising in effect six faces. One of these faces is used for the air intake, two, opposite each other, open into the resonant chambers 2, 2, and a third face is the one from which the useful vibratory power is taken off to the piezoelectric element 65. The two remaining faces of the combustion chamber may each be fitted likewise with a water column for conveying energy from the explosion chamber 4 to two additional vibratory electric generators 65. In this event the several crystals should be carefully ground to operate at one and the same frequency, and may be so coupled together, in parallel or series, with respect to each other and the output circuit, as to generate in synchronism additively.

As with Fig. 1, the electric energy evolved by successive compressions of the piezoelectric element 65 may be supplied by way of a transformer 35 to a load 37 and a portion of it fed back, by way of an adjustable phase controlling device 43 to a spark gap 21' which may be located centrally of the explosion chamber 4 to set off successive explosions in sequence at the instants that the high pressure waves return to the explosion chamber 4 after reflection at the open ends 6, 6 of the resonating tubes 2.

In order to protect the crystal element 65 from the injurious effects of heat developed within the explosion chamber 4, the liquid 59 of the impedance-matching column may be circulated through the chamber 61 by a pump 70 driven by a motor 71 and passed through a heat radiating device 73 of conventional design. The liquid itself may be water or oil or a liquid containing solid particles in suspension.

The combustion chamber will, of course, be raised to quite a high temperature. It may therefore be constructed of heat resistant material. It may be cooled by radiation into an air stream or by water jacket. The combustion chambers indicated in the drawings have not been complicated by details of this kind, all of which are well-known expedients in the art of high temperature furnaces and engines.

In each of the figures discussed above the fuel intake means is shown, somewhat schematically, as a jet. It will be understood by those skilled in the art that in each case this jet is to be supplied from a suitable fuel source, and that it may be either continuous or of the intermittent type which characterizes certain types of internal combustion engines. Furthermore, if desired, the fuel may be admixed with the air, as by a carburetor which may be of conventional design, and supplied as a mixture to the air intake valve of any of the figures.

The broad idea of generating mechanical vibrations at high frequency and utilizing the energy of said vibrations to excite a vibratory type of electric generator is disclosed and claimed in applicant's Patent 2,509,913 granted May 30, 1950.

What is claimed is:

1. A vibratory system for production of electrical energy comprising a tubular resonator of such a length as to enclose a gaseous column having a predetermined natural resonance length, means for producing explosions at high frequency within said chamber, said frequency corresponding to the natural frequency of said resonator, a diaphragm mounted in a closed end of said resonator and separable therefrom, a vibratory piezoelectric element having electrically conductive coatings and electrical energy output terminals connected thereto, the natural vibratory frequency of said element, also being related to said frequency, and means mechanically coupling the piezoelectric element to the diaphragm, said coupling means being adapted to separably actuate said diaphragm relatively to said resonator to correspondingly vary the pressure in said enclosed gaseous column.

2. In combination an explosion chamber comprising a tubular structure enclosing a gaseous column having a predetermined natural mechanical resonance frequency for vibrations of longitudinal mode, means for introducing within said chamber near one end a gas which forms an explosive mixture with air, an ignition system arranged to ignite the explosive mixture at said frequency, a diaphragm positioned to close the end of the chamber near which the explosive mixture is introduced, said diaphragm being mounted to execute vibrations in the direction of longitudinal vibrations of the chamber and to periodically open and close said chamber at the vibrational frequency and a piezoelectric element, also adapted to vibrate at said frequency, and adapted to be actuated by said diaphragm and having electrical terminals from which an alternating electric force may be derived.

3. In combination, a partially open explosion chamber, one wall of said chamber comprising a diaphragm vibratable outward and inward of said chamber to correspondingly open and close said chamber, said chamber having such dimensions as to exhibit a high natural resonance frequency of vibration for the gas within the chamber, means for introducing a combustible vapor in the chamber, means for igniting said vapor to set up natural resonance vibrations within said chamber to therefore cause said diaphragm to vibrate at such resonance frequency and to correspondingly open and close said chamber and a piezoelectric element, also adapted to vibrate at said frequency, actuated by said diaphragm and having electrical terminals from which an alternating electromotive force may be derived.

4. An electric power source which comprises an acoustic resonant chamber having an open end and a substantially closed end, means for setting up acoustic pressure waves within said chamber, a piston-like member located at said substantially closed end and adapted to be displaced by the pressures of said waves, and a mechanical-electrical transducer coupled to said piston-like member.

5. An electric power source which comprises, an acoustic resonant chamber, a mechanical member mounted for reciprocating movement and comprising in part a bounding separable wall of said chamber, means for initiating an explosion adjacent said reciprocating member to cause movement thereof, a mechanical-electrical vibratory transducer mounted to be actuated by said member, means for utilizing electrical energy developed by said transducer in response to said actuation, and means for feeding back a portion of said electrical energy to control the timing of a subsequent explosion, the said mounting of said vibratory transducer being adapted to cause separation of said boundary wall portion from said chamber responsively to the vibratory movement of said transducer.

6. Apparatus as defined in claim 5 wherein the transducer and the reciprocating mechanical member are tuned to the same natural vibration frequency.

7. A confined column of gas, a mechanical-electrical transducer coupled to said gas column in a fashion to be actuated in response to pressures of said gas and to develop electrical energy when so actuated, means for feeding back a portion of said electrical energy to control said gas pressure, and means also coupled to said transducer and positioned so as to affect, responsively to the actuation of said transducer, the condition of confinement of said gas.

8. Apparatus to defined in claim 7 wherein the transducer and the gas column are tuned to the same natural frequency of vibration.

LLOYD ESPENSCHIED.

REFERENCES CITED

The following references are of record in the file of this patent:

UNITED STATES PATENTS

| Number | Name | Date |
| --- | --- | --- |
| 1,213,611 | Fessenden | Jan. 23, 1917 |
| 1,493,340 | Hahnemann et al. | May 6, 1924 |
| 1,500,243 | Hammond | July 8, 1924 |
| 1,544,010 | Jordan | June 30, 1925 |
| 2,063,951 | Steinberger | Dec. 15, 1936 |
| 2,111,036 | Wippel | Mar. 15, 1938 |
| 2,169,304 | Tournier | Aug. 15, 1939 |
| 2,215,895 | Wippel | Sept. 24, 1940 |
| 2,362,151 | Ostenberg | Nov. 7, 1944 |